(12) United States Patent
Pidgeon

(10) Patent No.: US 6,772,469 B1
(45) Date of Patent: Aug. 10, 2004

(54) MIRROR CLEANING DEVICE

(76) Inventor: James Pidgeon, 27 Martin Drive, Rainham, Essex (GB), RM13 9NB (*) Notice: Subject to any disclaimer, the term of this patent is extended or adjusted under 35 U.S.C. 154(b) by 100 days.

(21) Appl. No.: 10/144,340

(22) Filed: May 13, 2002

(51) Int. Cl.[7] .............................. B60S 1/20; B60S 1/56; B60S 1/44
(52) U.S. Cl. .............................. 15/250.003; 15/250.29; 15/250.24; 15/250.01
(58) Field of Search ........................ 15/250.003, 250.24, 15/250.29, 250.002, 250.16, 250.17, 250.01

(56) References Cited

U.S. PATENT DOCUMENTS

| | | | | |
|---|---|---|---|---|
| 2,944,277 A | * | 7/1960 | Ochello et al. ............. | 15/250.3 |
| 3,378,875 A | * | 4/1968 | Kern ........................ | 15/250.04 |
| 3,649,989 A | * | 3/1972 | Parker ...................... | 15/250.16 |
| 3,855,661 A | * | 12/1974 | Prince ...................... | 15/250.01 |
| 4,306,328 A | * | 12/1981 | Layton .................... | 15/250.003 |
| 4,466,712 A | * | 8/1984 | Vitaloni ....................... | 359/507 |
| 4,763,381 A | * | 8/1988 | Williams .................. | 15/250.01 |
| 6,343,402 B1 | * | 2/2002 | Smith et al. ............... | 15/250.3 |
| 6,530,110 B1 | * | 3/2003 | Breau et al. ........... | 15/250.003 |

FOREIGN PATENT DOCUMENTS

| | | | | |
|---|---|---|---|---|
| DE | 2904772 | * | 10/1979 | .............. 15/250.24 |
| DE | 3013976 | * | 10/1981 | ............ 15/250.003 |
| WO | 8600052 | * | 1/1986 | .............. 15/250.24 |

* cited by examiner

Primary Examiner—Gary K. Graham

(57) ABSTRACT

Mirror cleaning devices clean the external mirrors of large vehicles while they are being driven. During adverse weather conditions, the external mirrors of large vehicles can become occluded by rain, snow, or dirt. By keeping the mirror glass clean and moisture free, the driver is able to easily use the mirror without having to frequently pull to the roadside to clean moisture and dirt from the mirrors with a rag. The driver is able to maintain a full view to the rear sides at all times for safe passing, lane changing, merging, and reversing regardless of the weather conditions present.

1 Claim, 5 Drawing Sheets

MIRROR CLEANING DEVICE

BACKGROUND OF THE INVENTION

1. Field of the Invention

The present invention relates to a mirror cleaning device for use in connection with cleaning mirrors. The mirror cleaning device has particular utility in connection with cleaning the external mirrors of large vehicles while they are being driven to ensure good rearward visibility.

2. Description of the Prior Art

Mirror cleaning devices are desirable for cleaning the external mirrors of large vehicles while they are being driven. During adverse weather conditions, the external mirrors of large vehicles can become occluded by rain, snow, or dirt. This creates a dangerous situation by obscuring the driver's visibility of the rear sides of his vehicle. By keeping the mirror glass clean and moisture free, the driver is able to easily use the mirror without having to frequently pull to the roadside to clean moisture and dirt from the mirrors with a rag. The driver is able to maintain a full view to the rear sides at all times for safe passing, lane changing, merging, and reversing regardless of the weather conditions present.

The use of wiper apparatuses is known in the prior art. For example, U.S. Pat. No. 6,161,247 to Breau et al. discloses a mirror cleaning system. However, the Breau et al. '247 patent does not have an electrical motor to drive the wiper blade, and has further drawbacks of relying on pressurized air, thereby rendering the drive mechanism more vulnerable to disruption from dirt accumulation.

U.S. Pat. No. 4,306,328 to Layton discloses a wiper apparatus that wipes a mirror. However, the Layton '328 patent does not contain all drive parts within a housing, thereby rendering them vulnerable to adverse environmental conditions, and additionally does not spray a cleaning fluid onto the mirror.

Similarly, U.S. Pat. No. Des. 316,841 to Neff discloses a self-cleaning rearview mirror for truck or the like. However, the Neff '841 patent does not have a mounting plate and mounting post, and can not spray a cleaning fluid onto the mirror.

In addition, U.S. Pat. No. 4,527,301 to Seitz discloses a side view mirror truck windshield wiper. However, the Seitz '301 patent does not spray a cleaning fluid onto the mirror, and has the additional deficiency of not containing all drive parts within a housing, thereby rendering them vulnerable to adverse environmental conditions.

Furthermore, U.S. Pat. No. 5,363,236 to Han discloses a motor vehicle rearview mirror wiper device. However, the Han '236 patent does not have an electric motor, and also does not have a belt for a transmission.

Lastly, U.S. Pat. No. 5,157,551 to Spence discloses a mirror wiper apparatus. However, the Spence '551 patent does not spray a cleaning fluid onto the mirror, and also lacks a belt for a transmission.

While the above-described devices fulfill their respective, particular objectives and requirements, the aforementioned patents do not describe a mirror cleaning device that allows cleaning the external mirrors of large vehicles while they are being driven to ensure good Rearward visibility. The Breau et al. '247 patent relies upon pressurized air, thereby rendering the mechanism more vulnerable to fouling. The Layton '328 patent, the Neff '841 patent, the Seitz '301 patent, and the Spence '551 patent make no provision for spraying a cleaning solution onto The mirror. The Han '236 patent does not have an electric motor to drive the wiper blade.

Therefore, a need exists for a new and improved mirror cleaning device that can be used for cleaning the external mirrors of large vehicles while they are being driven to ensure good rearward visibility. In this regard, the present invention substantially fulfills this need. In this respect, the mirror cleaning device according to the present invention substantially departs from the conventional concepts and designs of the prior art, and in doing so provides an apparatus primarily developed for the purpose of cleaning the external mirrors of large vehicles while they are being driven to ensure good rearward visibility.

SUMMARY OF THE INVENTION

In view of the foregoing disadvantages inherent in the known types of wiper apparatuses now present in the prior art, the present invention provides an improved mirror cleaning device, and overcomes the above-mentioned disadvantages and drawbacks of the prior art. As such, the general purpose of the present invention, which will be described subsequently in greater detail, is to provide a new and improved mirror cleaning device which has all the advantages of the prior art mentioned heretofore and many novel features that result in a mirror cleaning device which is not anticipated, rendered obvious, suggested, or even implied by the prior art, either alone or in any combination thereof.

To attain this, the present invention essentially comprises a mirror support, a mirror attached to the mirror support, and a wiping device attached to the mirror support. The mirror support may take the form of a mounting plate and mounting post. The wiping device may take the form of a wiper blade driven by a drive mechanism comprising an electrical motor, a cog-type belt, a drive pin, a carriage with rollers, and a carriage roller track. The drive mechanism may be housed within the mirror support.

There has thus been outlined, rather broadly, the more important features of the invention in order that the detailed description thereof that follows may be better understood and in order that the present contribution to the art may be better appreciated.

The invention may also include a cleaning solution spray nozzle and hose, and a wiper position signal switch and signal wire to notify the driver when the wiper is in its uppermost position so that cleaning solution may be applied in the most optimal fashion. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved mirror cleaning device that has all of the advantages of the prior art wiper apparatuses and none of the disadvantages.

It is another object of the present invention to provide a new and improved mirror cleaning device that may be easily and efficiently manufactured and marketed.

An even further object of the present invention is to provide a new and improved mirror cleaning device that has a low cost of manufacture with regard to both materials and labor, and which accordingly is then susceptible of low prices of sale to the consuming public, thereby making such mirror cleaning device economically available to the buying public.

Still another object of the present invention is to provide a new mirror cleaning device that provides in the apparatuses and methods of the prior art some of the advantages thereof, while simultaneously overcoming some of the disadvantages normally associated therewith.

Even still another object of the present invention is to provide a mirror cleaning device for cleaning the external mirrors of large vehicles while they are being driven to ensure good rearward visibility. This allows the driver to clean his external mirrors while driving the vehicle.

Still yet another object of the present invention is to provide a mirror cleaning device for cleaning the external mirrors of large vehicles while they are being driven to ensure good rearward visibility. This makes it possible to spray a cleaning solution onto the mirror.

A further object of the present invention is to provide a mirror cleaning device for cleaning the external mirrors of large vehicles while they are being driven to ensure good rearward visibility. This ensures that the wiper blade drive mechanism is not vulnerable to failure from adverse environmental conditions.

An additional object of the present invention is to provide a mirror cleaning device for cleaning the external mirrors of large vehicles while they are being driven to ensure good rearward visibility. This allows the driver to use the mirror cleaning device without first making complex air pressure adjustments to ensure that the cleaning device functions correctly.

Lastly, it is an object of the present invention to provide a new and improved mirror cleaning device for cleaning the external mirrors of large vehicles while they are being driven to ensure good rearward visibility.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE CURRENT EMBODIMENT

Figure 1:
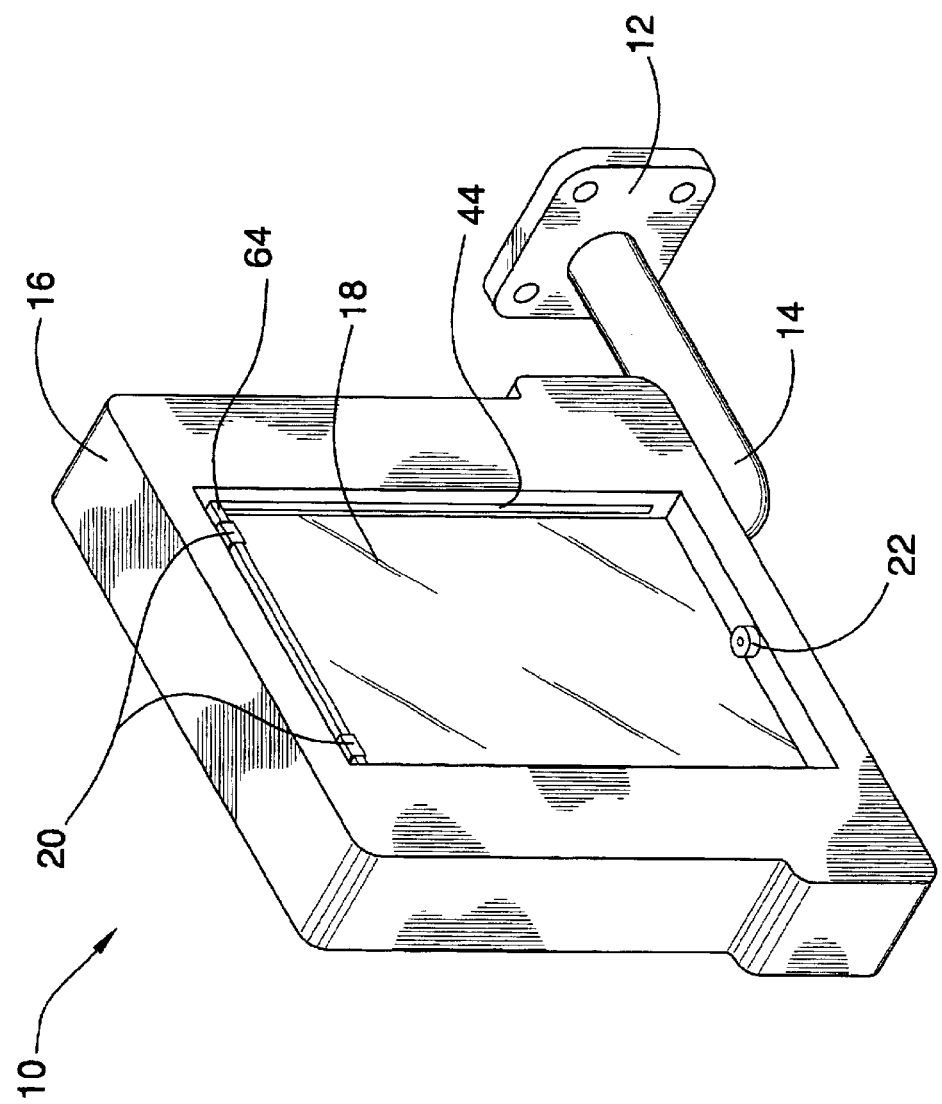
FIG. 1 is a front perspective view of the current embodiment of the mirror cleaning device constructed in accordance with the principles of the present invention.

Referring now to the drawings, and particularly to FIGS. 1–5, a current embodiment of the mirror cleaning device of the present invention is shown and generally designated by the reference numeral 10.

In FIG. 1, a new and improved mirror cleaning device 10 of the present invention for cleaning the external mirrors of large vehicles while they are being driven to ensure good rearward visibility is illustrated and will be described. More particularly, the mirror cleaning device 10 has a unit 12 mounting plate made of steel for attaching the mirror cleaning device to a vehicle. Welded to mounting plate 12 is mounting post 14, also made of steel. Threadedly connected to mounting post 14 is mirror housing 16, also made of steel. Mirror 18 is housed within mirror housing 16. Wiper shaft 64 made of rubber with wiper blade clasps 20 made of spring steel is shown with one end inserted into carriage roller track 44. Spray nozzle 22 made of stainless steel is shown at the base of mirror 18.

Figure 2:
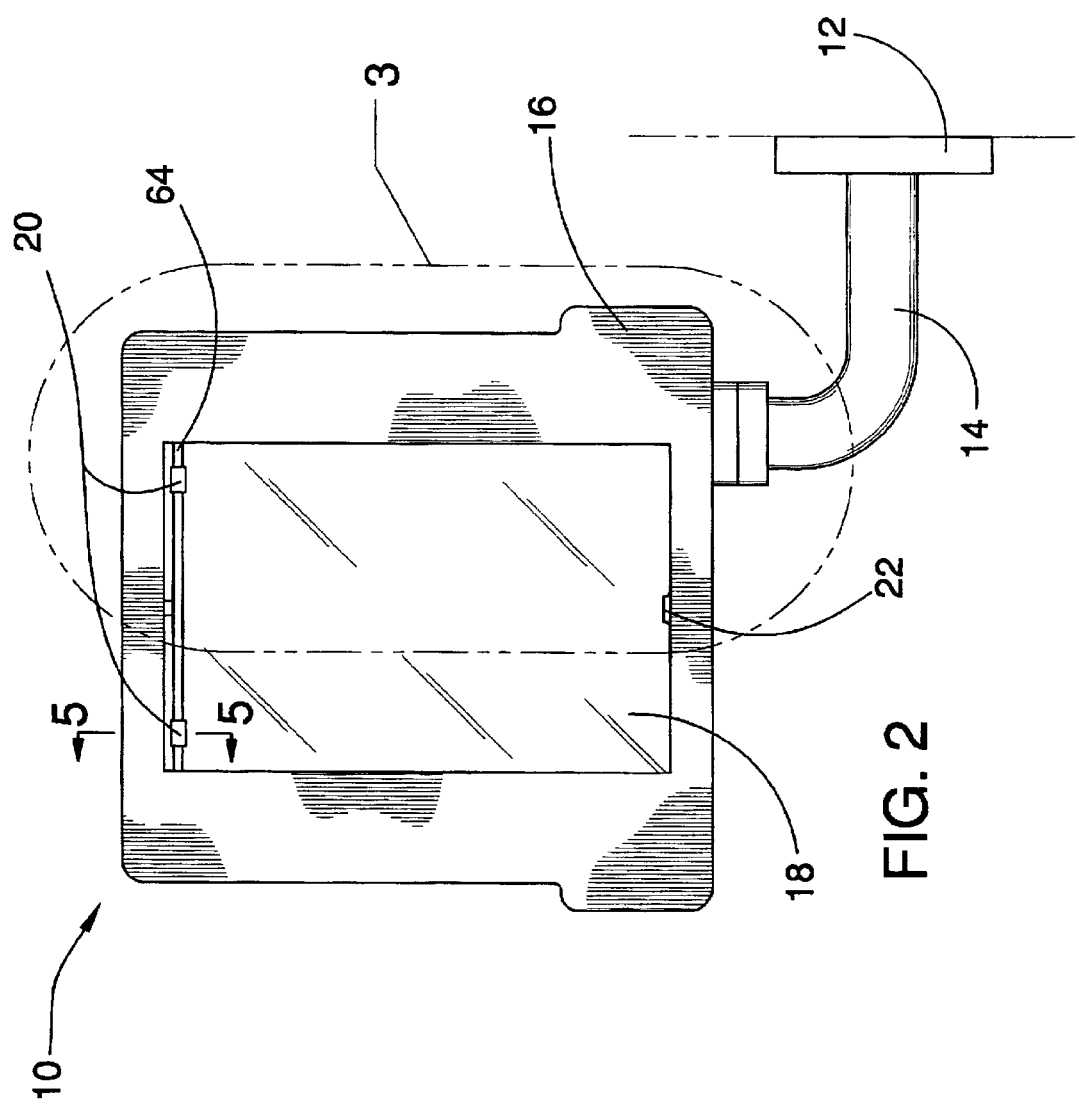
FIG. 2 is a front side view of the mirror cleaning device of the present invention.

Moving on to FIG. 2, a new and improved mirror cleaning device 10 of the present invention for cleaning the external mirrors of large vehicles while they are being driven to ensure good rearward visibility is illustrated and will be described. More particularly, the mirror cleaning device 10 has a mounting plate 12 with attached mounting post 14 and mirror housing 16. Mirror 18 is shown, along with wiper shaft 64 with wiper blade clasps 20. Spray nozzle 22 is also visible.

Figure 3:
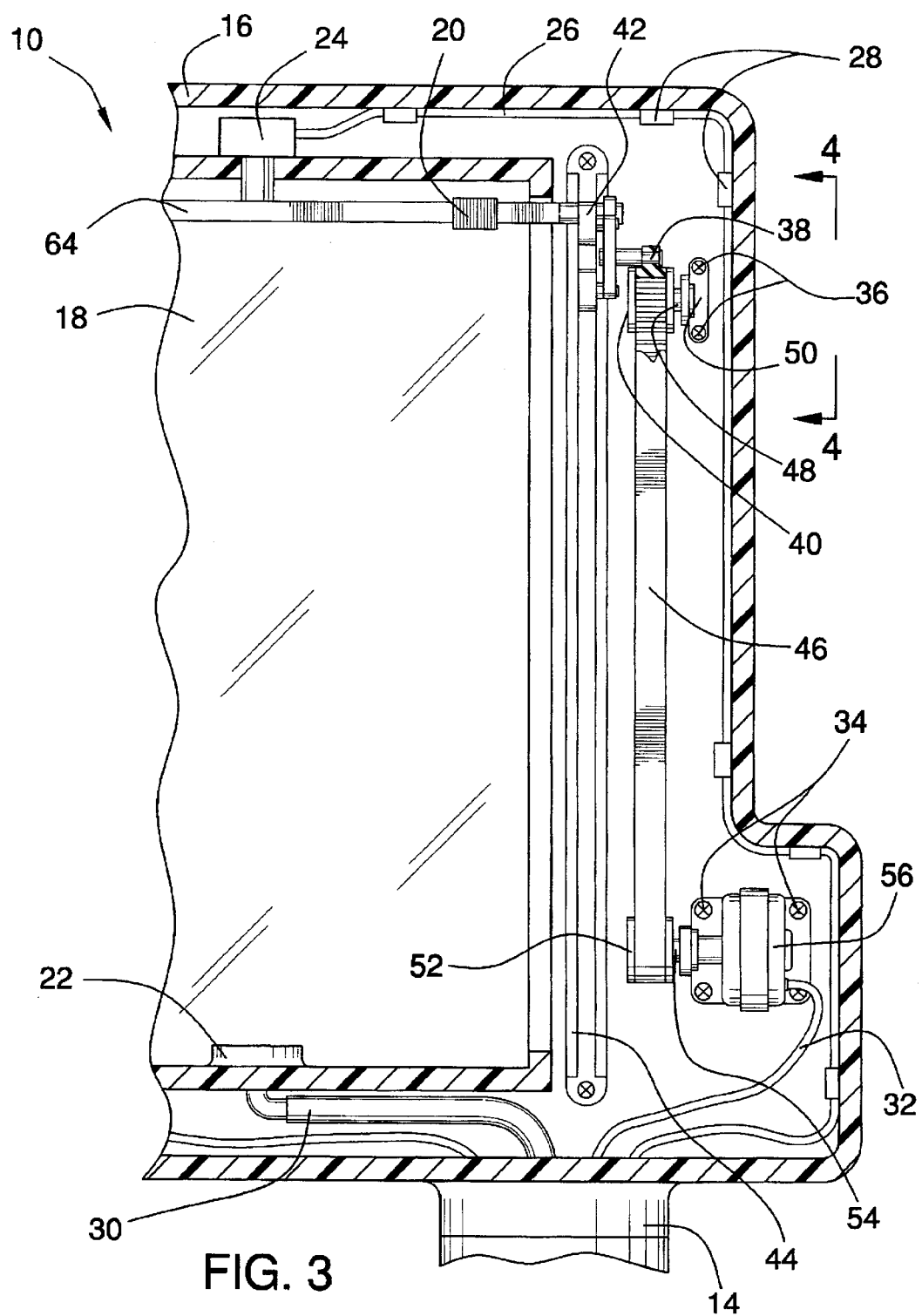
FIG. 3 is a front side sectional view of the mirror cleaning device of the present invention.

Continuing with FIG. 3, a new and improved mirror cleaning device 10 of the present invention for cleaning the external mirrors of large vehicles while they are being driven to ensure good rearward visibility is illustrated and will be described. More particularly, the mirror cleaning device 10 has a mirror housing 16 attached to mounting post 14. Mirror 18 is shown enclosed within mirror housing 16. Spray nozzle 22 with hose 30 is shown at the base of mirror 18. Wiper shaft 64 with wiper clasps 20 is shown inserted into carriage 42. Carriage 42 resides within carriage roller track 44. Drive pin 38 connects carriage 42 to cog-type rubber belt 46. Belt 46 is held in tension between upper tension wheel 40 and lower tension wheel 52. Upper tension wheel 40 has an upper tension wheel axle 48 connected to upper axle mount 50. Upper axle mount 50 is connected to mirror housing 16 by screws 36. Lower tension wheel 52 has a lower tension wheel axle 54 connected to motor 56. Motor 56 receives electricity via power wire 32. Motor 56 is attached to mirror housing 16 by screws 34. Wiper position signal switch 24 is shown being contacted by wiper shaft 64 when wiper shaft 64 is in its uppermost position. Signal wire 26 to convey the electrical signal from wiper position signal switch 24 is shown with clips 28 attaching signal wire 26 to mirror housing 16.

Figure 4:
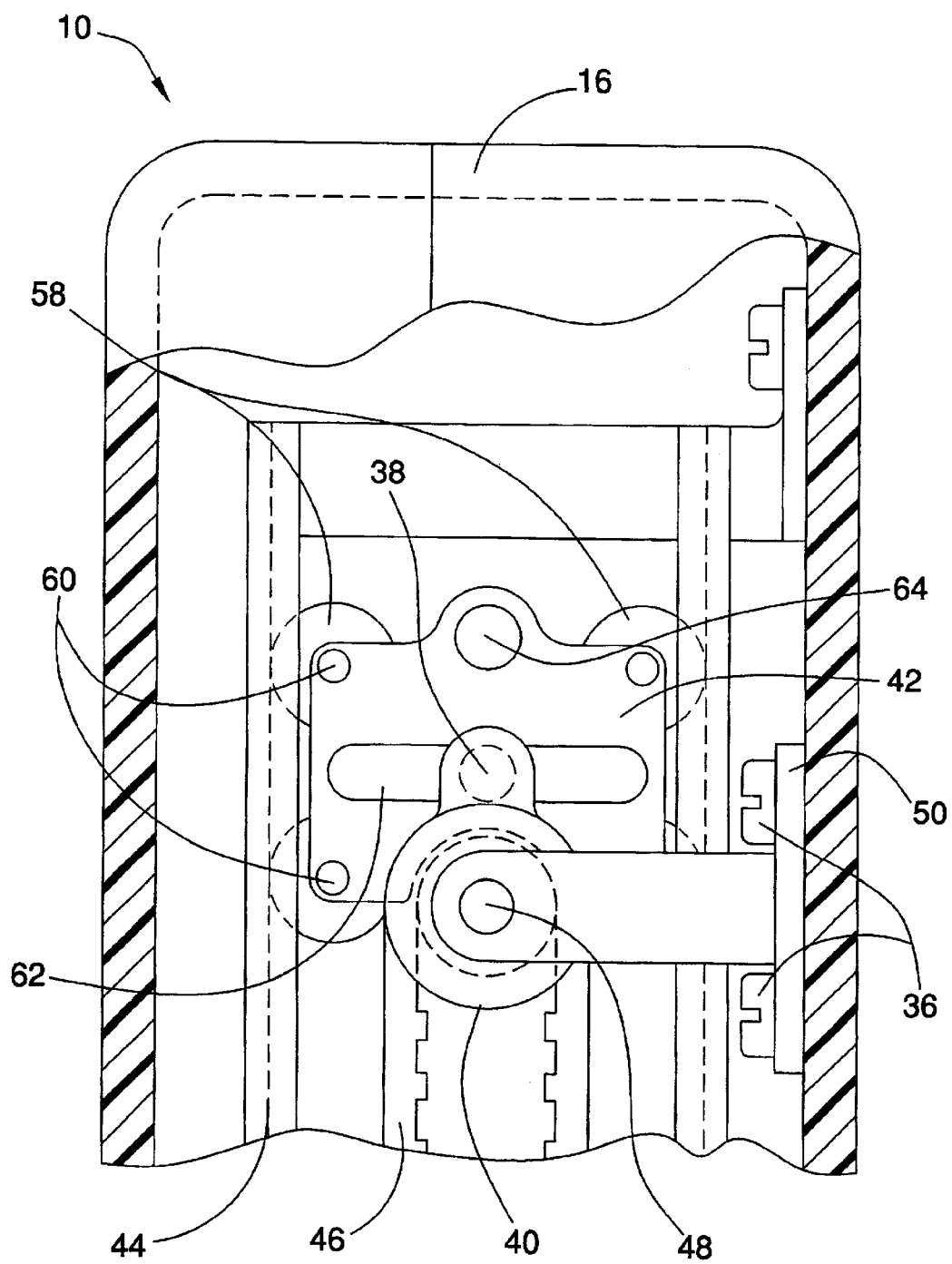
FIG. 4 is a right side sectional view of the mirror cleaning device of the present invention.

Additionally, in FIG. 4, a new and improved mirror cleaning device 10 of the present invention for cleaning the external mirrors of large vehicles while they are being driven to ensure good rearward visibility is illustrated and will be described. More particularly, the mirror cleaning device 10 has a mirror housing 16 with upper axle mount 50 attached by screws 36. Attached to mirror housing 16 is carriage roller track 44. Contained within carriage roller track 44 is carriage 42 with carriage rollers 58, roller axle 60, and drive pin slot 62. Inserted into drive pin slot 62 is drive pin 3 8 which also is connected to belt 46. Belt 46 is held in tension by upper tension wheel 40 with upper tension wheel axle 48. Upper tension wheel axle 48 is attached to upper axle mount 50. Upper axle mount 50 is attached to mirror housing 16 by screws 36.

Figure 5:
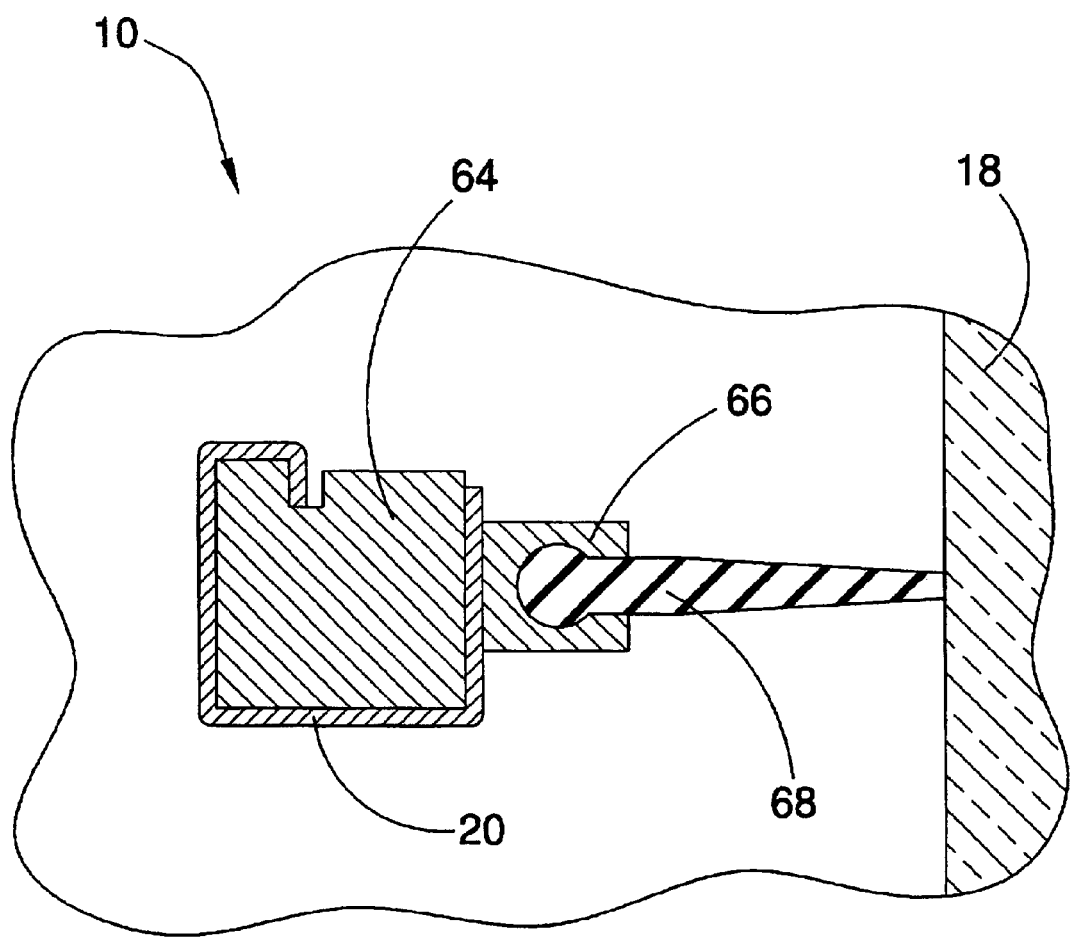
FIG. 5 is a left side sectional view of the mirror cleaning device of the present invention.

Finally, in FIG. 5, a new and improved mirror cleaning device 10 of the present invention for cleaning the external mirrors of large vehicles while they are being driven to ensure good rearward visibility is illustrated and will be described. More particularly, the mirror cleaning device 10 has a wiper blade 68 made of rubber held in sliding contact with the surface of mirror 18 by blade retaining bar 66. Wiper shaft 64 with wiper blade clasp 20 complete the wiper device assembly.

While a current embodiment of the mirror cleaning device has been described in detail, it should be apparent that modifications and variations thereto are possible, all of which fall within the true spirit and scope of the invention. With respect to the above description then, it is to be unrealized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as aluminum, titanium, or plastic may be used instead of the steel mounting plate, mounting post, and mirror housing described. Also, the rubber wiper shaft may also be made out of metal or plastic.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A mirror cleaning device comprising:

a mounting plate;

a mounting post having opposing ends with one end attached to said mounting plate;

a mirror housing connected to said opposite end of said mounting post;

a mirror enclosed within said mirror housing;

a carriage roller track attached to said mirror housing;

a carriage roller held by said carriage roller track;

a roller axle inserted through said carriage roller;

a carriage having a middle attached to said roller axle;

a drive pin slot wherein said middle of said carriage comprises a slot therein to comprise said drive pin slot;

a drive pin inserted into said drive pin slot;

a cog-type belt connected to said drive pin;

an upper tension wheel stretching said belt;

an upper tension wheel axle inserted through said upper tension wheel;

an upper axle mount attached to said upper tension wheel axle;

a lower tension wheel stretching said belt;

a lower tension wheel axle inserted through said lower tension wheel;

a wiper shaft having a bottom removably attached to said carriage;

a blade retaining bar attached to said bottom of said wiper shaft;

a wiper blade having a top with said top enclosed by said blade retaining bar;

a wiper blade clasp clasping said wiper shaft;

a spray nozzle attached to said mirror housing;

a hose having opposing ends with one end attached to said spray nozzle;

a wiper position signal switch attached to said mirror housing and positioned so that it is actuated by said wiper when said wiper is at its uppermost position;

an electrically conductive signal wire having opposing ends with one end attached to said wiper position signal switch;

clips attaching said signal wire to said mirror housing;

an electrical motor attached to said lower tension wheel axle;

an electrically conductive power wire having opposing ends with one end attached to said electrical motor, and a screw attached to said electrical motor.

* * * * *